United States Patent
Karakaya

(10) Patent No.: US 11,186,916 B2
(45) Date of Patent: Nov. 30, 2021

(54) SYSTEM AND METHOD FOR DECOMPOSING GASEOUS HYDROGEN SULFIDE INTO HYDROGEN GAS AND ELEMENTARY SULFUR

(71) Applicant: TURKIYE PETROL RAFINERILERI ANONIM SIRKETI TUPRAS, Kocaeli (TR)

(72) Inventor: Cuneyt Karakaya, Kocaeli (TR)

(73) Assignee: TURKIYE PETROL RAFINERILERI ANONIM SIRKETI TUPRAS, Korfez/Kocaeli (TR)

( * ) Notice: Subject to any disclaimer, the term of this patent is extended or adjusted under 35 U.S.C. 154(b) by 79 days.

(21) Appl. No.: 16/638,679

(22) PCT Filed: Dec. 29, 2017

(86) PCT No.: PCT/TR2017/050724
§ 371 (c)(1),
(2) Date: Feb. 12, 2020

(87) PCT Pub. No.: WO2019/035789
PCT Pub. Date: Feb. 21, 2019

(65) Prior Publication Data
US 2021/0189573 A1 Jun. 24, 2021

(30) Foreign Application Priority Data
Aug. 18, 2017 (TR) ................... 2017/12330

(51) Int. Cl.
*C25B 1/55* (2021.01)
*C25B 9/67* (2021.01)
(Continued)

(52) U.S. Cl.
CPC ............ *C25B 1/55* (2021.01); *C01B 17/0495* (2013.01); *C25B 1/02* (2013.01); *C25B 9/67* (2021.01); *C25B 15/08* (2013.01)

(58) Field of Classification Search
CPC ........ C25B 5/08; C25B 15/083; C25B 15/087; C25B 1/50; C25B 1/01; C25B 1/00; C25B 1/04; C25B 1/02; C25B 1/55
(Continued)

(56) References Cited

U.S. PATENT DOCUMENTS

| 4,526,774 A | 7/1985 | Maas, Jr. et al. |
| 5,908,545 A | 6/1999 | Donini et al. |
| 2006/0275193 A1 | 12/2006 | Mao et al. |

FOREIGN PATENT DOCUMENTS

| EP | 0127595 A2 | 12/1984 |
| WO | 98/32518 A1 | 7/1998 |

OTHER PUBLICATIONS

Insoluble vs. Immiscible (https://wikidiff.com/immiscible/insoluble 2021) (Year: 2021).*

(Continued)

*Primary Examiner* — Nicholas A Smith
(74) *Attorney, Agent, or Firm* — Notaro, Michalos & Zaccaria P.C.

(57) ABSTRACT

Decomposing gaseous hydrogen sulfide ($H_2S$) having at least one pump supplying $H_2S$ gas in the form of bubbles; an aqueous acidic phase having at least one redox couple that do not mix with each other because of density difference and form an interface where they contact each other; and at least one column reactor having an organic phase with a density above the density of water and capable to dissolve elementary sulfur, where an oxidation reaction takes place in the interface by which the $H_2S$ bubbles carried into the organic phase through the pump are converted into elementary sulfur.

18 Claims, 1 Drawing Sheet

(51) Int. Cl.
  *C01B 17/04*  (2006.01)
  *C25B 1/02*  (2006.01)
  *C25B 15/08*  (2006.01)
(58) Field of Classification Search
  USPC .................................................. 205/617, 637
  See application file for complete search history.

(56) References Cited

OTHER PUBLICATIONS

Immiscible Definition and Examples (https://www.thoughtco.com/definition-of-immiscible-and-example-605237 2021). (Year: 2021).*
Benzonitrile (https://en.wikipedia.org/wiki/Benzonitrile ) (Year: 2021).*
Dibutylamine (https://en.wikipedia.org/wiki/Dibutylamine ) (Year: 2021).*
Propylene Carbonate (https://en.wikipedia.org/wiki/Propylene_carbonate ) (Year: 2021).*
Toluene (https://en.wikipedia.org/wiki/Toluene ) (Year: 2021).*
Xylene (https://en.wikipedia.org/wiki/Xylene ) (Year: 2021).*
International Search Report and Written Opinion for corresponding PCT application No. PCT/TR2017/050724, dated Jan. 22, 2019.
International Preliminary Report on Patentability for corresponding PCT application No. PCT/TR2017/050724, completed Nov. 8, 2019.

* cited by examiner

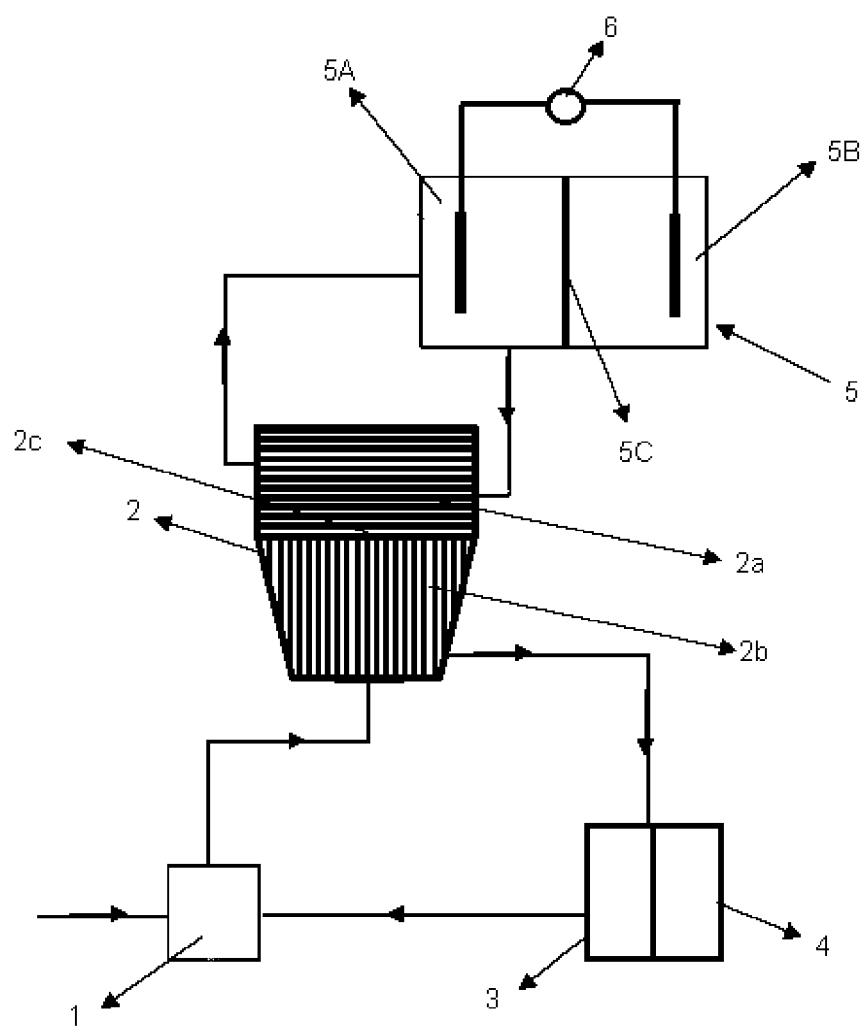

SYSTEM AND METHOD FOR DECOMPOSING GASEOUS HYDROGEN SULFIDE INTO HYDROGEN GAS AND ELEMENTARY SULFUR

TECHNICAL FIELD

The present invention relates to a system and a method for decomposing gaseous hydrogen sulfide ($H_2S$) particularly generated in oil refineries into hydrogen gas and elementary sulfur.

PRIOR ART

Hydrogen sulfide ($H_2S$) is a gas widely found in oil and natural gas processing fields and in oil refineries. $H_2S$ is present naturally in crude oil (sulfurous crude oil), as well as in natural gas- and oilfields with wells, in oil refineries and in pipelines used to transport crude oil/natural gas. It is also generated as a result of different processes in refineries, such as hydrocracking, hydrolysis, and elementary sulfur generation. In order to achieve standard fuel (e.g. EURO 6 fuel) properties, sulfur is removed in sulfur removal units in refineries using hydrogen gas so that significant amounts of hydrogen sulfide ($H_2S$) is released.

Hydrogen sulfide ($H_2S$), which is a poisonous and flammable gas evolving unexpectedly during routine works, is one of the most dangerous gases in oil and gas industry. $H_2S$ is a colorless and invisible gas and can only be perceived with its smell. However, its smell is not a reliable factor for this gas, since if air with $H_2S$ is inhaled, the olfactory perception is lost rapidly. Depending on the amount exposed, gaseous $H_2S$ gives rise to loss of consciousness and sudden death. Therefore, the $H_2S$ evolved should be brought under control. Additionally, $H_2S$ has two economically-valuable elements (H and S). Therefore, the decomposition of $H_2S$, which is an undesirable side product, is advantageous for refineries. Hydrogen, one of the elements to be obtained from $H_2S$, is used in refineries in important processes like hydrogenation, desulfurization and hydrocracking, and is obtained generally from the reforming reaction of natural gas.

The most common method used for converting gaseous $H_2S$ into sulfur is the Claus process. By virtue of this process, $H_2S$ is almost completely decomposed into elementary sulfur and water by means of a partial oxidation reaction with air. A major drawback of this process, however, is that the energy stored in $H_2S$ is partially wasted with the generation of $H_2O$. Therefore, the yield obtained is not adequate. Another drawback of the Claus process is the evolution of environmentally hazardous gases. This process increases the amount of tail gases giving rise to sulfur dioxide ($SO_2$) emissions and to a significant amount of carbon dioxide ($CO_2$) emission. Therefore, even if the Clauss process is widely used, it has considerable hazards on the environment.

In terms of all these drawbacks, novel methods have been searched for obtaining elementary sulfur. Accordingly, there have been attempts to develop such electrochemical or photochemical processes having a higher efficiency potential and generating less side products as compared to conventional chemical processes. Thus, the use of electrical energy has been provided which is generated from environmentally friendly processes such as wind and solar energy, and it has been aimed to contribute to the reduction of the emission of greenhouse gases.

The patent document US20060275193 A1 relates to decomposing $H_2S$ by means of electrochemical methods, wherein a solution comprising sulfur ions is oxidized in a unit by contacting the solution with an oxidizing gas so that elementary sulfur is separated from the liquid phase by means of precipitation. The patent document U.S. Pat. No. 4,526,774 A, in turn, relates to an indirect hydrogen sulfide conversion process for producing hydrogen and elementary sulfur based on the electrochemical oxidation of iodide. As a result of the process, sulfur is obtained in a plastic form and is taken out of the system by means of crystallization. However, such photo-/electrochemical methods are performed in acidic medium. Despite the fact that the generated sulfur is stable in acidic conditions, the solubility of acidic $H_2S$ gas in acidic conditions is very low. For this reason, some unfavorable conditions giving rise to sulfur storage, catalyst surface poisoning, and gummy sulfur formation are encountered such that elementary sulfur obtained can not be removed smoothly from the system. Therefore, such $H_2S$ decomposing systems cannot provide long-term and sustained operations.

The prior art further comprises photo-/electrochemical methods which are conducted in a basic medium. The patent document U.S. Pat. No. 5,908,545 A is an example of such photo-/electrochemical methods, wherein a process for obtaining hydrogen and sulfur from hydrogen sulfide is carried out so that hydrogen sulfide is mixed with a basic solution and this mixture is taken to an electrolytic cell comprising an anode and a cathode. Such processes carried out in basic media, in turn, involves stability problems of elementary sulfur. Under basic conditions, despite the fact that acidic $H_2S$ becomes ionized and converted to $S_2^-$, it chemically reacts with $OH^-$ and becomes oxidized or gives rise to side products, making it impossible to achieve an ideal decomposition process. Additionally, due to the fact that the cell voltage required for decomposition is high, such processes have high energy consumption and therefore a lower efficiency. Furthermore, the surface of anode used in decomposition is poisoned by dissolved $S_2^-$ and therefore no long lasting experiments can be conducted. This, in turn, causes another undesired condition in conversion processes.

BRIEF DESCRIPTION OF INVENTION

A decomposition system is developed according to the present invention for decomposing gaseous hydrogen sulfide ($H_2S$) into hydrogen gas and elementary sulfur, this system comprising at least one pump taking $H_2S$ gas from a source and supplying it into the system in the form of bubbles; an aqueous acidic phase with a pH below 4 and providing the ionization of $H_2S$ gas in water, having at least one redox couple which do not mix with each other because of density difference and thus form an interface where they contact each other; and at least one column reactor comprising an organic phase with a density above the density of water and capable to dissolve elementary sulfur, wherein an oxidation reaction takes place in the interface by which the $H_2S$ bubbles carried into the the organic phase through the pump are converted into elementary sulfur; at least one cooling unit to which the elementary sulfur generated in the column reactor is transferred and is crystallized to be taken out of the system; at least one photo-/electrochemical cell comprising at least one first chamber comprising at least one anode electrode, at least one second chamber comprising at least one cathode electrode, and at least one membrane separating the first chamber from the second chamber, to which the aqueous acidic phase in the column reactor is transferred and in which the oxidation of the redox couple and the reduction reaction of $H^+$ to $H_2$ takes place, wherein following the reduction reaction, the aqueous acidic phase is transferred back to the column reactor; and at least one energy source generating the required potential difference to be conducted to at least one of the electrodes for the oxidation of the redox couple and the reduction reaction of $H^+$ to $H_2$.

Also a $H_2S$ decomposition method is developed according to the present invention, this method comprising the steps of generating $H_2S$ bubbles by distributing $H_2S$ gas taken from a source into an organic phase provided in a column reactor through at least one pump; decomposing $H_2S$ into elementary sulfur and $H^+$ ions by oxidizing the $H_2S$ bubbles in an interface between an aqueous acidic phase with a pH below 4, comprising at least one redox couple for ionizing the $H_2S$ gas in water, and the organic phase which has a density above that of water and is capable to dissolve elementary sulfur; transferring the $H^+$ ions decomposed from $H_2S$ into the aqueous acidic phase; dissolving elementary sulfur decomposed from $H_2S$ in the organic phase; crystallizing the organic phase saturated with dissolved elementary sulfur by cooling down through a cooling unit and then taken out of the system; feeding the organic phase purified from elementary sulfur back into the column reactor; passing $H^+$ ions into the aqueous acidic phase by a redox reaction in the interface between $H_2S$ gas and the one of the redox couple provided in the aqueous acidic phase which has a higher oxidation state than that of $H_2S$; transferring the aqueous acidic phase to a first chamber of the photo-/electrochemical cell; subjecting the one of the redox couple in the aqueous acidic phase transferred to the first chamber that has the lower oxidation state to oxidation regeneration; passing the $H^+$ ions present in the aqueous acidic phase to a second chamber by means of diffusion along a membrane present in the photo-/electrochemical cell; reducing the $H^+$ ions passed to the second chamber into $H_2$ gas; taking the generated $H_2$ gas out of the photo-/electrochemical cell; feeding back the regenerated aqueous acidic phase to the column reactor to oxidize $H_2S$ into elementary sulfur.

By virtue of the decomposition system and method developed according to the present invention, the problems of sulfur storage, catalyst surface poisoning, gummy sulfur formation encountered in acidic media are avoided. Thus, elementary sulfur is removed from the system in a more convenient manner. Therefore, a system and a method is achieved with the present invention for $H_2S$ decomposition, wherein long lasting, low cost, efficient and uninterrupted processes can be carried out.

OBJECT OF INVENTION

The object of the present invention is to develop a decomposition system and method wherein elementary sulfur and hydrogen gas are decomposed from $H_2S$.

Another object of the present invention is to develop a system and a method for decomposing gaseous $H_2S$ into hydrogen gas and elementary sulfur whereby sulfur storage is avoided.

A further object of the present invention is to develop a system and a method for decomposing gaseous $H_2S$ into hydrogen gas and elementary sulfur whereby catalyst surface poisoning is avoided.

Still a further object of the present invention is to develop a $H_2S$ decomposition system and method whereby gummy sulfur formation is avoided.

Yet a further object of the present invention is to develop a $H_2S$ decomposition system and method wherein elementary sulfur formed as a result of decomposition is removed in a problem-free manner.

DESCRIPTION OF FIGURES

A representative embodiment of the system and method for decomposing $H_2S$ gas into hydrogen gas and elementary sulfur is illustrated in the following figures described below.

FIG. 1 is a schematic view of a system developed according to the present invention.

The parts in said figures are individually designated as following.
Pump (1)
Column reactor (2)
Aqueous acidic phase (2a)
Aqueous organic phase (2b)
Interface (2c)
Cooling unit (3)
Filter (4)
Photo-/Electrochemical cell (5)
First chamber (5A)
Second chamber (5B)
Membrane (5C)
Energy source (6)

DESCRIPTION OF INVENTION

Hydrogen sulfide ($H_2S$) is present as a side product in gas streams generated in some processes conducted in oil refineries, such as the hydrodesulfurization of heavy oils, gasification of pitch and coal, and the refinement of fossil fuels. $H_2S$ gas, as an undesired side product, is subjected to a decomposition process and converted into hydrogen gas and elementary sulfur. Despite the availability of a number of methods to carry out this decomposition process in the prior art, some of them are environmentally hazardous. In some others, the acidic/basic media used give rise to sulfur storage, the poisoning of catalyst surfaces, and the formation of gummy sulfur, and these facts, in turn, avoid a smooth removal of elementary sulfur. A decomposition system and method is developed according to the present invention for decomposing gaseous $H_2S$ into hydrogen gas and elementary sulfur wherein all these problems are solved.

The gaseous hydrogen sulfide ($H_2S$) decomposition system developed according to the present invention comprises:
  at least one pump (1) providing the supply of $H_2S$ gas from a source into the system in the form of bubbles (the pump is preferably a micro bubble generator);
  an aqueous acidic phase with a pH below 4 and providing the ionization of $H_2S$ gas, comprising at least one redox couple which do not mix with each other because of density difference and thus form an interface (2c) where they contact each other; and at least one column reactor (2) comprising an organic phase (2b) with a density above the density of water (1.000 g/cm$^3$) and capable to dissolve elementary sulfur, wherein an oxidation reaction takes place in the interface (2c) by which the $H_2S$ bubbles carried into the organic phase (2b) by through the pump (1) are converted into elementary sulfur;
  at least one cooling unit (3) to which the elementary sulfur produced in the column reactor (2) is transferred and is crystallized to be taken out of the system;
  at least one photo-/electrochemical cell (5), which comprise at least one first chamber (5A) comprising at least one anode electrode, at least one second chamber (5B) comprising at least one cathode electrode, and at least one membrane (5C) separating the first chamber from the second chamber, to which the aqueous acidic phase (2a) in the column reactor (2) is transferred and in which the oxidation of the redox couple and the reduction reaction of $H^+$ to $H_2$ take place, wherein following the reduction reaction, the aqueous acidic phase (2a) is transferred back to the column reactor (2);

and at least one energy source (6) generating the required potential difference to be conducted to at least one of the electrodes for the oxidation of the redox couple and the reduction reaction of $H^+$ to $H_2$ (the energy source is preferably an electrical power supply and/or UV/visible light source).

The gaseous hydrogen sulfide ($H_2S$) decomposition method developed according to the present invention, in turn, comprises the steps of generating $H_2S$ bubbles by distributing gaseous $H_2S$ received from a source into an organic phase (2b) provided in a column reactor (2) through at least one pump (1);

decomposing $H_2S$ into elementary sulfur and $H^+$ ions by oxidizing the $H_2S$ bubbles in an interface (2c) between an aqueous acidic phase (2a), comprising at least one redox couple and having a pH below 4 and providing the ionization of $H_2S$ in water, and the organic phase (2b) which has a density above the density of water and is capable to dissolve elementary sulfur;

transferring the $H^+$ ions decomposed from $H_2S$ into the aqueous acidic phase (2a);

dissolving elementary sulfur decomposed from $H_2S$ in the organic phase (2b);

crystallizing the organic phase (2b) saturated with dissolved elementary sulfur by cooling down through a cooling unit (3) and then removed from the system;

supplying the organic phase (2b) purified from elementary sulfur back into the column reactor (2);

passing $H^+$ ions into the aqueous acidic phase (2a) by a redox reaction in the interface (2c) of $H_2S$ gas with the one of the redox couple in the aqueous acidic phase that has a higher oxidation state than that of $H_2S$;

transferring the aqueous acidic phase (2a) to a first chamber (5A) of the photo-/electrochemical cell (5);

subjecting the one of the redox couple in the aqueous acidic phase (2a) transferred to the first chamber (5A) that has the lower oxidation state to oxidation regeneration;

passing the $H^+$ ions present in the aqueous acidic phase (2a) to a second chamber (5B) by means of diffusion along a membrane (5C) present in the photo-/electrochemical cell (5);

reducing the $H^+$ ions passed to the second chamber (5B) into $H_2$ gas;

feeding back the regenerated aqueous acidic phase (2a) to the column reactor (2) to oxidize $H_2S$ into elementary sulfur.

In the method developed according to the present invention, the reaction of $H_2S$ gas in the interface (2c) with the one of the redox couple in the aqueous acidic phase (2a) which has a higher oxidation state than that of $H_2S$ results in the reduction of the redox couple having a higher oxidation state to the redox couple having a lower oxidation state.

In the system and method developed according to the present invention, the site where the aqueous acidic phase (2a) and the organic phase (2b) contact each other is denominated as the interface (2c). This interface (2c) is formed due to the density difference between the aqueous acidic phase (2a) and the organic phase (2b). Since the density of the organic phase (2b) is higher than that of the aqueous acidic phase (2a), it occupies a lower position of the reactor with the aqueous acidic phase (2a) above it. $H_2S$ oxidation takes place in the interface (2c) formed between these two phases. By virtue of this, elementary sulfur becomes dissolved in the organic phase (2b), whereas the $H^+$ ions gets into the aqueous phase (2a). Therefore, by virtue of said interface (2c), the transfer of elementary sulfur, $H_2S$, $HS^-$, $S^{2-}$, $S^0$, polysulfides ($S_x^{n-}$) and $SO_4^{2-}$, which are quite difficult to be separated from water, into the aqueous acidic phase (2a) is prevented, such that elementary sulfur can be obtained from the organic phase (2b) by means of low-cost processes such as crystallization/filtration etc. . . . By virtue of the interface (2c), the problems in the form of sulfur storage, catalyst surface poisoning, gummy sulfur formation, which are encountered in acidic media, are eliminated. The interface (2c) and reactions occurring in the interface (2c) are elaborated below.

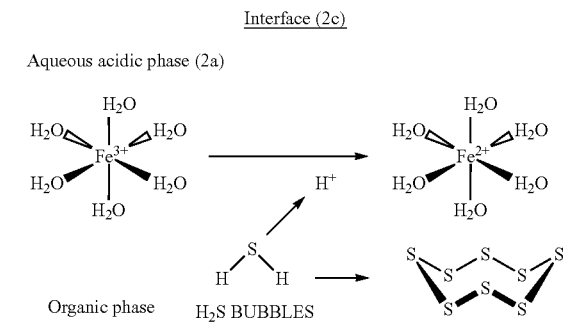

Since elementary sulfur dissolves in organic phase (2b) and its transfer to the aqueous acidic phase (2a) is prevented by the interface (2c), sulfur species like elementary sulfur and polysulfide ions aren't present in the photo-/electrochemical cell (5) either. Therefore, the oxidation of the redox couple and the reduction of $H^+$ to $H_2$ take place in the photo-/electrochemical cell (5). After the aqueous acidic phase (2a) leaves the photo/electrochemical cell (5) in the system according to the present invention, and after the organic phase (2b) is purified from elementary sulfur by filtration, they are fed back to the column reactor (2). By virtue of this, the integration of the aqueous acidic phase (2a) and the organic phase (2b) in terms of their circulation is ensured and an uninterrupted or continuous production of elementary sulfur and $H_2$ from $H_2S$ is provided. Therefore, a long lasting, low cost, efficient and uninterrupted process can be conducted according to the present invention for decomposing $H_2S$.

In a preferred embodiment of the system developed according to the present invention, the system comprises at least one filter (4) providing the removal of crystallized elementary sulfur from the system. Said filter is preferably a vacuum filter, wherein the organic phase (2b) purified from elementary sulfur as a result of filtration is supplied back into the column reactor (2). In a preferred embodiment according to the present method, in turn, the elementary sulfur crystallized in the cooling unit (3) is passed through at least one filter (4) and removed from the system.

In an alternative embodiment of the system developed according to the present invention, the system comprises preferably a UV/visible light source, wherein at least one of the electrodes is an electrode that interacts with this light source. When the system comprises a UV/visible light source, the anode electrode and/or cathode electrode can be selected from a group of hybrid electrodes which comprise platinum, palladium, metal sulfites, metal phosphites, metal selenides (the metal is preferably Ag, Fe, Co, Ni, Mo or W) on photoactive substrates of silicon, AgS, CdSe, CdS, CdTe and $Cu_2O$. By virtue of this light source, the method developed is not only an electrochemical, but also a photo/electrochemical method. Thus, in addition to an electrical power supply, the method also makes use of daylight so that the amount of non-renewable energy required for decomposition can be reduced.

In another preferred embodiment of the system developed according to the present invention, the redox couple provided in the aqueous acidic phase (2a) is preferably $I^3/I^-$, $[Fe(CN)_6]^{3-}/[Fe(CN)_6]^{4-}$, Co (III) $(byp)_3$/Co (II) $(byp)_3$, metal salts and/or metallocenes. Here, said metal salts comprise preferably $Fe^{3+}/Fe^{2+}$, $Co^{3+}/Co^{2+}$, $Mn^{3+}/Mn^{2+}$ and $Ce^{3+}/Ce^{4+}$ cations and $SO_4^{2-}$, $NO_3$, $Cl^-$ anions. Said redox couple is preferably $Fe^{2+}/Fe^{3+}$. On the other hand, the acid present in the aqueous acidic phase (2a) is preferably sulfuric acid, hydrochloric acid and/or nitric acid.

In the method developed according to the present invention, the redox couple provided in the aqueous acidic phase (2a), which is preferably $Fe^{2+}/Fe^{3+}$, is used as an electrolyte. As a result of the reactions occurring in the system developed according to the present invention, $S^{2-}$ generated from $H_2S$ is converted into elementary sulfur without being directly oxidized in oxidation reactions at low pH or without side reactions taking place, this providing a significant advantage for the present invention. The redox couple reacts with $H_2S$ in the interface (2c) to give elementary sulfur, and then the redox couple is oxidized in the first chamber (5A) of the photo/electrochemical cell (5) and renewed accordingly. Here in the first chamber (5A), the one of the redox couple that has a lower oxidation number becomes the one of the redox couple that has a higher oxidation number.

Developing a process not involving the use of aqueous solutions for converting $H_2S$ into elementary sulfur is required for industrial $H_2S$ decomposition. This is achieved with the present invention by using an organic phase (2b) immiscible with water, capable to partially dissolve sulfur and having a density that is higher than that of water. By virtue of this phase, the sulfur generated in the interface (2c) as a result of a series of reactions is separated without getting mixed with the aqueous acidic phase (2a). In a preferred embodiment of the system developed according to the present invention, the organic phase (2b) is pure chlorobenzene, pure chlorobenzene toluene and/or a mixture thereof with benzene or carbon disulfide.

In an alternative embodiment of the system developed according to the present invention, the anode electrode and/or cathode electrode is selected from a group of graphite, vitreous carbon, platinum, palladium, metals, metal oxides, metal sulfites, metal phosphites, metal selenides (the metal is preferably Ag, Fe, Co, Ni, Mo or W) and semiconductors. Additionally, the surface of the anode electrode and/or the cathode electrode is coated with $SiO_2$ and/or $Al_2O_3$. Thus, the electrodes are protected against acid corrosion and their service life is increased.

The reactions taking place in electrochemical cells in the $H_2S$ decomposition process developed according to the present invention are as shown in Example 1, Example 2 and Example 3.

Example 1: Electrochemical Decomposition

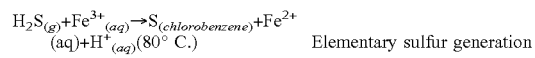

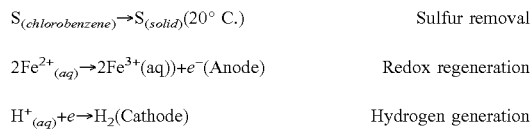

Example 2: Photoelectrochemical (Photo-Cathode) Decomposition

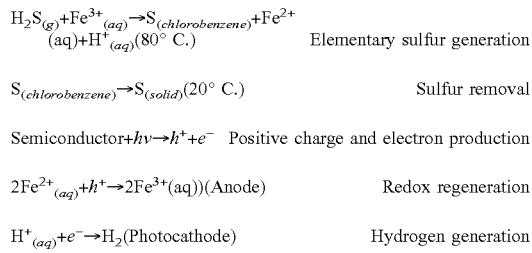

Example 3: Photoelectrochemical (Photo-Anode) Decomposition

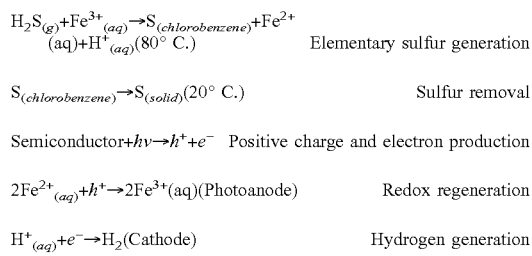

By virtue of the decomposition system and method developed according to the present invention, the problems of sulfur storage, catalyst surface poisoning, gummy sulfur formation encountered in acidic media are avoided. Thus, elementary sulfur is removed from the system in a more convenient manner. Therefore, a system and a method is achieved with the present invention for $H_2S$ decomposition, wherein long lasting, low cost, efficient and uninterrupted processes can be carried out.

The invention claimed is:

1. A decomposition system providing the decomposition of gaseous hydrogen sulfide into hydrogen gas and elementary sulfur, characterized by comprising at least one pump (1) providing the supply of $H_2S$ gas from a source into the system in the form of bubbles;

an aqueous acidic phase with a pH below 4, providing the ionization of $H_2S$ gas in water and comprising at least one redox couple;

and at least one column reactor (2) comprising an organic phase (2b), which is immiscible in water, with a density above the density of water and capable to dissolve elementary sulfur, wherein the organic phase (2b) stays below the aqueous acidic phase, wherein the aqueous phase and the organic phase do not mix with each other because of density difference and thus form an interface (2c) where they contact each other; and an oxidation reaction takes place in the interface (2c) by which the $H_2S$ bubbles carried into the organic phase (2b) through the pump (1) are converted into elementary sulfur;

at least one cooling unit (3) to which the elementary sulfur generated in the column reactor (2) is transferred and is crystallized to be taken out of the system;

at least one photo-/electrochemical cell (5), which comprises at least one first chamber (5A) comprising at least one anode electrode, at least one second chamber (5B) comprising at least one cathode electrode, and at least one membrane (5C) separating the first chamber (5A) from the second chamber (5B), and to which the aqueous acidic phase (2a) in the column reactor (2) is transferred, and in which the oxidation of the redox couple and the reduction reaction of $H^+$ to $H_2$ take place, wherein following the reduction reaction, the aqueous acidic phase (2a) is transferred back to the column reactor (2);

and at least one energy source (6) generating the required potential difference to be conducted to at least one of the electrodes for the oxidation of the redox couple and the reduction reaction of $H^+$ to $H_2$.

2. The system according to claim 1, characterized in that said pump (1) is a micro bubble generator.

3. The system according to claim 1, characterized by comprising at least one filter (4) by which crystallized elementary sulfur is taken from the system.

4. The system according to claim 1, characterized in that said energy source (1) is an electrical power supply.

5. The system according to claim 1, characterized in that said energy source (1) is a UV/visible light source.

6. The system according to claim 1, characterized in that the redox couple is $I^3/I^-$, $[Fe(CN)_6]^{3-}/[Fe(CN)_6]^{4-}$, $Co(III)(byp)_3/Co(II)(byp)3$, metal salts and/or metallocenes.

7. The system according to claim 6, characterized in that said metal salts comprise $Fe^{3+}/Fe^{2+}$, $Co^{3+}/Co^{2+}$, $Mn^{3+}/Mn^{2+}$ and $Ce^{3+}/Ce^{4+}$ cations and $SO_4^{2-}$, $NO_3^-$, $Cl^-$ anions.

8. The system according to claim 1, characterized in that said redox couple is $Fe^{2+}/Fe^{3+}$.

9. The system according to claim 1, characterized in that the acid source of the aqueous acidic phase (2a) is sulfuric acid, hydrochloric acid and/or nitric acid.

10. The system according to claim 1, characterized in that said organic phase (2b) is pure chlorobenzene, pure chlorobenzene toluene and/or a mixture thereof with benzene or carbon disulfide.

11. The system according to claim 1, characterized in that the anode electrode and/or the cathode electrode is selected from a group comprising graphite, vitreous carbon, platinum, palladium, metals, metal oxides, metal sulfites, metal phosphites, metal selenides and semiconductors.

12. The system according to claim 11, characterized in that said metal is Ag, Fe, Co, Ni, Mo or W.

13. The system according to claim 1, characterized in that the surface of the anode electrode and/or of the cathode electrode is coated with $SiO_2$ and/or $Al_2O_3$.

14. The system according to claim 5, characterized in that the anode electrode and/or the cathode electrode is selected from a group comprising hybrid electrodes which comprise platinum, palladium, metal sulfites, metal phosphites, metal selenides on photoactive substrates of silicon, AgS, CdSe, CdS, CdTe and $Cu_2O$.

15. The system according to claim 14, characterized in that said metal is Fe, Co, Ni, Mo or W.

16. The system according to claim 3, characterized in that the filter (4) is a vacuum filter.

17. A decomposition method providing the decomposition of gaseous hydrogen sulfide into hydrogen gas and elementary sulfur, characterized by comprising the steps of
generating $H_2S$ bubbles by distributing gaseous $H_2S$ received from a source into an organic phase (2b) provided in a column reactor (2) through at least one pump (1);
decomposing $H_2S$ into elementary sulfur and $H^+$ ions by oxidizing the $H_2S$ bubbles in an interface (2c) between an aqueous acidic phase (2a), comprising at least one redox couple and having a pH below 4 and providing the ionization of $H_2S$ in water, and the organic phase (2b) which has a density above the density of water and is capable to dissolve elementary sulfur;
transferring the $H^+$ ions decomposed from $H_2S$ into the aqueous acidic phase (2a);
dissolving elementary sulfur decomposed from $H_2S$ in the organic phase (2b);
crystallizing organic phase (2b) saturated with dissolved elementary sulfur by cooling down through a cooling unit (3) and then taken out of the cooling unit (3);
supplying the organic phase (2b) purified from elementary sulfur back into the column reactor (2);
passing $H^+$ ions into the aqueous acidic phase (2a) by a redox reaction in the interface (2c) of $H_2S$ gas with the one of the redox couple in the aqueous acidic phase that has a higher oxidation state than that of $H_2S$;
transferring the aqueous acidic phase (2a) to a first chamber (5A) of the photo-/electrochemical cell (5);
subjecting the one of the redox couple, which is present in the aqueous acidic phase (2a) transferred to the first chamber (5A), that has the lower oxidation state to oxidation regeneration;
passing the $H^+$ ions present in the aqueous acidic phase (2a) to a second chamber (5B) by means of diffusion along a membrane (5C) present in the photo-/electrochemical cell (5);
reducing the $H^+$ ions passed to the second chamber (5B) into $H_2$ gas;
taking the generated $H_2$ gas from the photo-/electrochemical cell (5);
feeding back the regenerated aqueous acidic phase (2a) to the column reactor (2) to oxidize $H_2S$ into elementary sulfur.

18. The method according to claim 17, characterized in that the elementary sulfur crystallized in the cooling unit (3) is passed through at least one filter (4) and removed from the cooling unit (3).

* * * * *